United States Patent [19]

Zarniko et al.

[11] Patent Number: 4,943,119

[45] Date of Patent: Jul. 24, 1990

[54] HEIGHT CONTROL DEVICE AND METHOD FOR A FIXTURE FOR MACHINING AN OBJECT ESSENTIALLY DEFINED BY A SINGLE PLANE

[75] Inventors: Martin Zarniko, Diez; Willibald Sehr, Waldbrunn-Ellar, both of Fed. Rep. of Germany

[73] Assignee: MOBA - Electronic, Fed. Rep. of Germany

[21] Appl. No.: 274,831

[22] Filed: Nov. 22, 1988

[30] Foreign Application Priority Data

Aug. 24, 1988 [DE] Fed. Rep. of Germany ... 8810670[U]

[51] Int. Cl.[5] ............... E01C 23/08; G01S 15/08; G01S 15/88
[52] U.S. Cl. .................................. 299/1; 181/123; 299/39; 404/84; 404/90
[58] Field of Search ............... 299/1, 36, 39; 404/72, 404/75, 84, 90; 73/105, 146, 628, 629, 597; 181/123, 124; 367/87, 140

[56] References Cited

U.S. PATENT DOCUMENTS

| | | | |
|---|---|---|---|
| 3,158,945 | 12/1964 | Curlett et al. | 404/84 X |
| 3,414,327 | 12/1968 | Austin | 299/1 |
| 3,720,818 | 3/1973 | Spragg et al. | 73/105 X |
| 4,213,719 | 7/1980 | Swisher, Jr. et al. | 404/84 |
| 4,750,584 | 6/1988 | Tanaka et al. | 181/123 |

Primary Examiner—Jerome W. Massie, IV
Assistant Examiner—David J. Bagnell
Attorney, Agent, or Firm—Harry M. Weiss

[57] ABSTRACT

A height control device for a fixture which comprises at least a pair of gauging devices each having an ultrasonic transceiver for gauging a certain distance. A signal generator is connected to both gauging devices for generating a signal representative of the change in the level height due to machining. A control device is also provided for elevating or lowering the machining fixture.

10 Claims, 2 Drawing Sheets

HEIGHT CONTROL DEVICE AND METHOD FOR A FIXTURE FOR MACHINING AN OBJECT ESSENTIALLY DEFINED BY A SINGLE PLANE

This invention relates to a height control device for a fixture for machining an object essentially defined by a single plane by means of a machining tool for changing the level height of the plane, in particularly for a milling fixture for stripping road surfacing.

BACKGROUND OF THE INVENTION

One such milling fixture for stripping road surfacing has a roller-type milling cutter provided with a rotary drive. Said roller-type milling cutter is mounted on a road surface-handling machine by means of a height control device. Said roller-type milling cutter is held in a bearing frame. Said bearing frame can be elevated and lowered with respect to the road surface-handling machine by means of a hydraulic actuator, said height control device signalling the hydraulic actuator such that the roller-type milling cutter strips a defined thickness layer from the road surfacing. Said height control device has a mechanical sensor for sensing the level height of the bearing frame with respect to the unmachined road surfacing. This mechanical sensor in prior art height control devices constitutes, for example, a sensing wheel with height adjustment. Although milling cutters when "as new", i.e. when the roller-type milling cutter is unworn, permit achieving good accuracies when using such a prior art height control device for guiding the roller-type milling cutter with respect to the unmachined road surfacing so that the layer thickness stripped from the road surfacing remains essentially constant, the resulting wear of the roller-type milling cutter in the course of operation causes a reduction in the actual cutting diameter of the milling cutter. Said prior art height control device can only be made to compensate for such wear by readjusting the mechanical sensor manually. A further problem of said prior art height control device is that the mechanical sensor for sensing the road surfacing can easily be damaged under the rough conditions which normally exist in road repair work.

It is generally known that gauging can also be done with non-mechanical proximity-type sensors. Ultrasonic sensors have also been in use in the construction equipment sector for some time. However, the application of ultrasonic gauging devices in the construction equipment sector is limited to instances in which highly accurate control is not a mandatory requirement. The reason for this limitation in the scope of application is that the sensing accuracy of an ultrasonic gauging device is greatly influenced by the temperature, flow and humidity of the ambient air, by the operating voltage, by the momentary atmospheric pressure and by similar influencing factors, at least when not provided with relatively complicated means of compensation. Since the percentual overall error accumulated under worst-case conditions from these influencing factors is of a magnitude similar to that of the cutting depth to be maintained relative to the distance of an ultrasonic gauging device away from a road surface, a height control device for milling fixtures used in stripping a road surfacing exists only in mechanical form, not incorporating ultrasonic gauging.

SUMMARY

Viewed from one aspect, the present invention provides a height control device of the aforementioned type in such an embodiment that it compensates for the wear of the machining tool, provides highly accurate height control of the machining tool and eliminates the sensitivity to damage or maladjustments prevalent in mechanical sensors.

This aspect is achieved by the present invention providing a height control device for a fixture for machining an object essentially defined by a single plane by means of a machining tool for changing the level height of the plane, in particularly for a milling fixture for stripping road surfacing, comprising:

a first gauging device featuring a first ultrasonic transceiver for gauging the distance from the ultrasonic transceiver to the unmachined plane of the object, a second gauging device featuring a second ultrasonic transceiver for gauging the distance from the second ultrasonic transceiver to the machined plane, a signal generator connected to both gauging devices for generating a first signal representing the change in the level height due to machining from the quotient or difference of the distances measured by said first and second gauging devices, and a control device for elevating or lowering the machining fixture so that the signal representing the change in the level height due to machining essentially corresponds to a setpoint value for changing the level height due to machining.

The invention provides for two gauging devices, one of which measures the distance to the unmachined plane, the other, the distance to the machined plane. A signal generator establishes a variable from the quotient or difference of the distances which represents the change in the height level as a result of machining and which can be considered as the cutting depth in the applicational case of the milling fixture. A control device provides for elevating or lowering the machining fixture in such a way that said variable representing the change in the height level due to machining is brought into agreement with a setpoint variable. This arrangement as provided for by the invention automatically compensates wear of the machining tool. Furthermore, obtaining the quotient fully compensates the ambient conditions as regards their effect on the accuracy of the ultrasonic gauging device whilst obtaining the difference also achieves adequate compensation of the ambient conditions affecting ultrasonic gauging in practical applications. More precisely, obtaining the quotient, for example, compensates any effect of changing air temperature, pressure, flow and humidity and fluctuating operating voltages on the travel time of the ultrasonic signal. Due to the difference between the distance to the unmachined plane and the distance to the machined plane being very slight, as compared to the gauging distance, obtaining the difference is sufficient to compensate said influences.

Highly accurate height control can thus be achieved by a simple arrangement of at least two ultrasonic gauging devices which is insensitive to said disturbing factors and capable of compensating any tool wear.

Viewed from another aspect the invention provides for a third gauging device featuring a third ultrasonic transceiver for gauging the distance from said third ultrasonic transceiver to the unmachined plane of the object. This third gauging device is spaced from the first gauging device in a direction perpendicular to the direction of machining. This arrangement permits height control of the machining tool with which adaptation to a plane of the object for machining is possible when deviating from the horizontal.

Viewed from a further aspect a signal is also generated for said third gauging device by obtaining the quotient or difference with the signal of the second gauging device to indicate the change in the level height as a result of machining.

Viewed from yet a further aspect of the invention these two signals representing the change in the level height due to machining can each be compared separately to a setpoint value for the change in the level height, thus producing a first and a second reference signal.

Viewed from yet a further aspect of the invention said reference signals are used to signal a prior art electrohydraulic actuator in which an electrically operated first and second hydraulic valve is placed in circuit to move the left-hand and right-hand hydraulic actuators for adjusting the height of the tool on both sides accordingly.

Some embodiments of the invention will now be described by way of example and with reference to the accompanying drawings in which.

Figure 1:
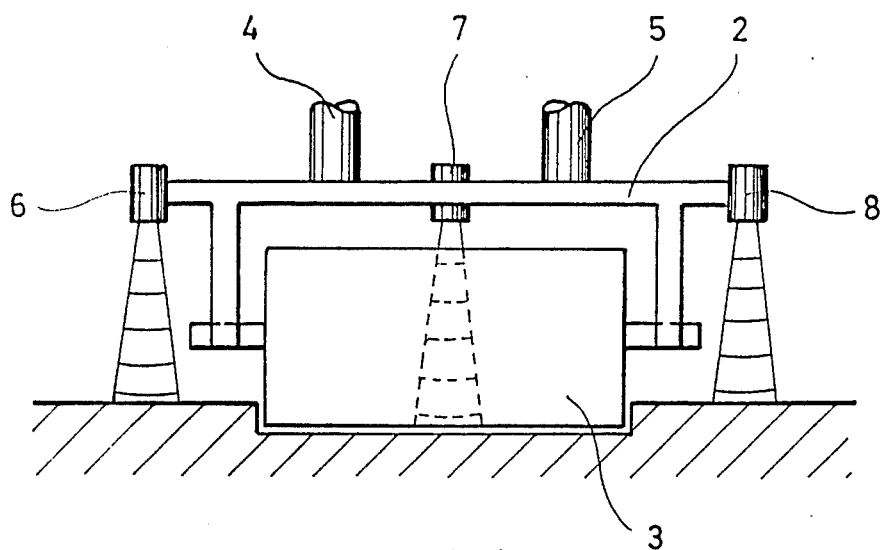
FIG. 1 is a schematic front view of a milling fixture for stripping road surfacing and featuring a height control device in accordance with the present invention.

As can be seen from FIG. 1, a milling fixture identified in its entirety by the reference number 1 has a bearing frame 2 mounting a roller-type milling cutter 3. Said rollertype milling cutter 3 is a rotary axis located essentially horizontal mounted in bearing frame 2 free to turn and driven in the required direction of rotation. Bearing frame 2 is mounted on a ( not shown ) road surface-handling machine for adjustment by two hydraulic cylinders 4, 5 to permit both raising and lowering of bearing frame 2 and a specific angular inclination of the bearing frame 2 by corresponding actuation of said hydraulic cylinders 4, 5 so that the turning axis of the roller-type milling cutter 3 can be angularly inclined with respect to the horizontal. The aforementioned milling cutter 1 having bearing frame 2, milling cutter 3 and hydraulic cylinders 4,5 is prior art and, therefore, there is no need to go into detail in describing the mechanical configuration. Actuating the hydraulic cylinders 4, 5 by means of ( not shown) valves to adjust the working height is also prior art.

Figure 2:
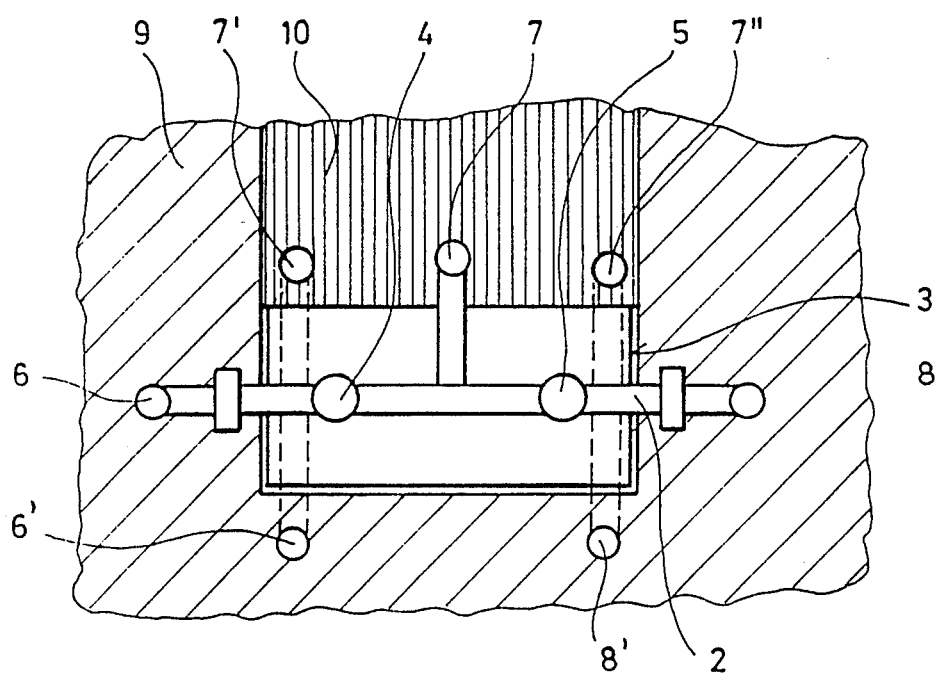
FIG. 2 is a plan view of the milling fixture shown in FIG. 1.

As can be seen from FIG. 1 particularly in conjunction with FIG. 2 the height control device,as the object of the invention for the milling fixture 1,features a first ultrasonic transceiver 6, a second ultrasonic transceiver 7 and preferably also a third ultrasonic transceiver 8 secured to the bearing frame 2 of said milling fixture 1 in such a way, that the first and third ultrasonic transceivers 6,8 are located outside of the working range of the milling cutter 3 so that they can gauge the distance to the unmachined plane of the road surfacing by sensing the ultrasonic propagation time. By contrast, the second ultrasonic transceiver 7 is arranged in such a way that it is capable of gauging the distance to the machined road surfacing by sensing the ultrasonic propagation time.

In FIG. 2 the unmachined area of the road surfacing is characterized by identification with reference number 9 and cross-hatched diagonally, whilst the milled area of the road surfacing is identified by reference number 10 and is cross-hatched vertically.

Instead of arranging the first and third ultrasonic transceivers 6, 8 to the right and left of the working area of the roller-type milling cutter 3 it is also possible to place said ultrasonic transceivers 6,8 ahead of the milling area of said roller-type milling cutter 3 as indicated by the reference numbers 6' and 8'. It is also possible to replace the second ultrasonic transceiver 7 arranged in the center in FIG. 2 by two separate ultrasonic transceivers 7', 7" each arranged near to the edge of the milled surface 10 of the road surfacing. This kind of arrangement permits sensing unsymmetrical wear of said roller-type milling cutter 3.

Figure 3:
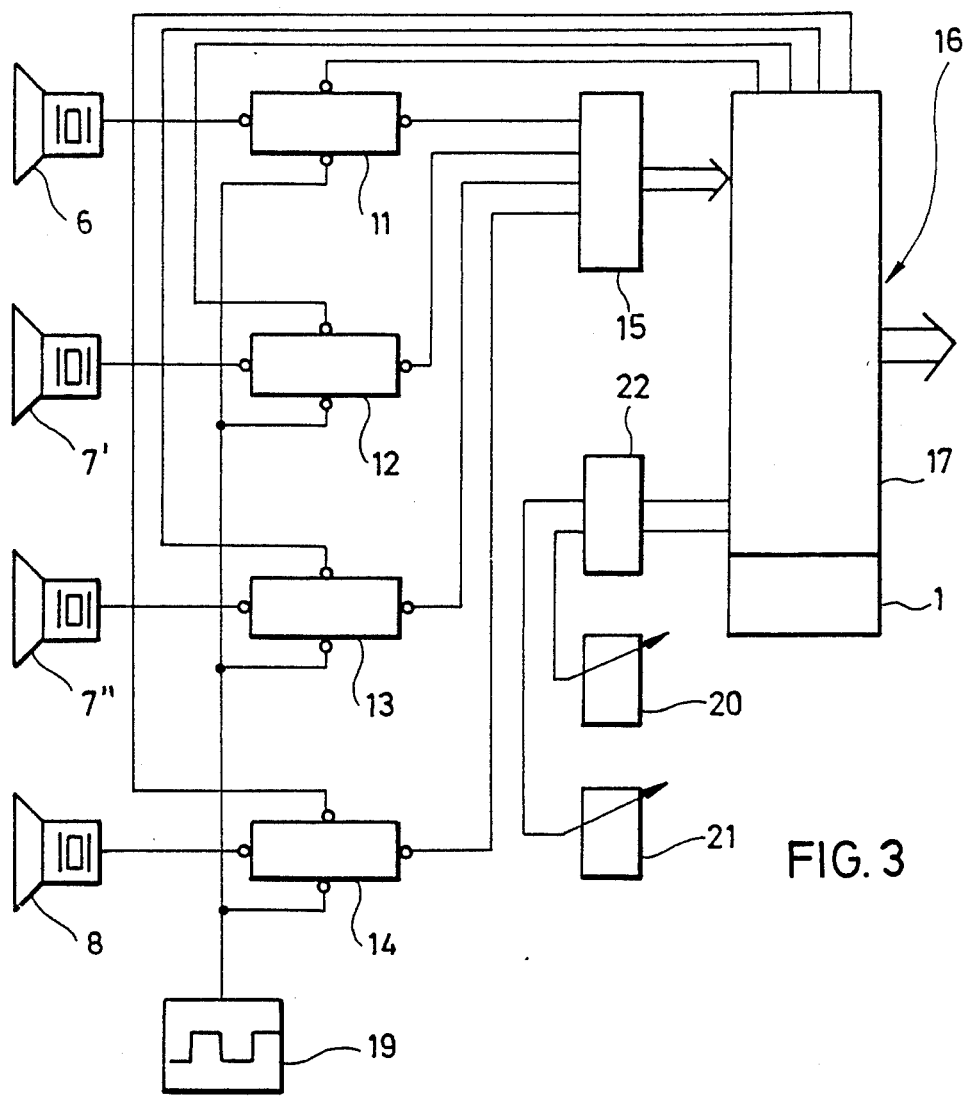
FIG. 3 is a circuit diagram of the height control device.

Turning now to FIG. 3 a circuit diagram of the height control device as the object of the invention will be explained. Ultrasonic transceivers 6, 7', 7",8 are connected via trasceiver circuits 11, 12, 13, 14 and an analog/digital converter 15 to a microcomputer 16,17 comprising a commercially available microprocessor type 8031 and a storage of the EPROM type. Each of the transceiver circuits 11 thru 14 is connected to a power oscillator 19.

For setting a setpoint value for the milling depth corresponding to the change in the level height as a result of machining, a setting control 20 is used which in conjunction with a further setting control 21 for setting the gauging sensitivity is connected via a further analog/digital converter 22 to the microcomputer 16.

Figure 4:
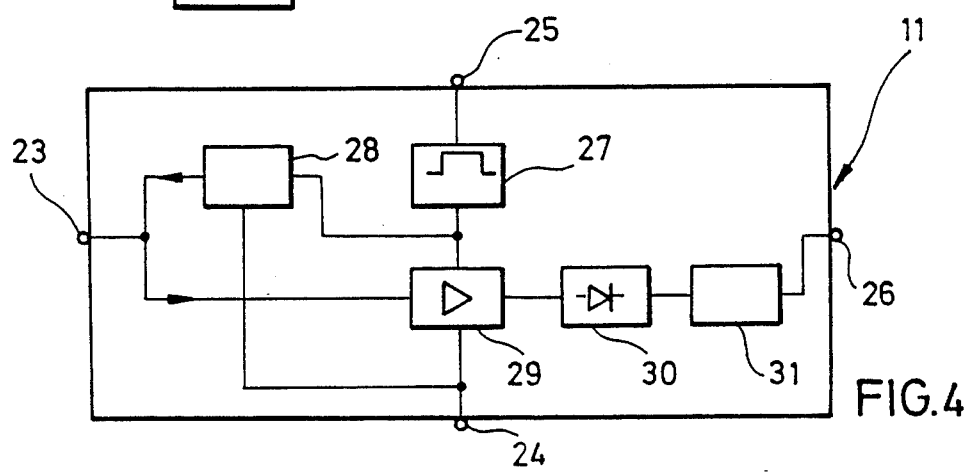
FIG. 4 is a circuit diagram of a transceiver circuit as contained in the circuit diagram as depicted in FIG. 3.

Turning now to FIG. 4 the design of the transceiver circuit 11 will be explained which is identical to that of receiver circuits 12 thru 14. Said transceiver circuit has a port 23 connecting the ultrasonic transceiver, a port 24 connecting the power oscillator, a port 25 serving as the control input from the microcomputer 16 and an output port 26 connected to the input of the analog/digital converter 15. The transceiver circuit has a monostable multivibrator 27, a gate 28, an amplifier 29, a rectifier stage 30 and a sensing circuit 31 which may be designed as an integration circuit. When the microcomputer 16 applies a control pulse to port 25, this will trigger the monostable multivibrator 27. For the duration of the signal as established by the monostable multivibrator amplifier 29 is deactivated and gate 28 opened. In this condition power oscillator 19 is connected to the corresponding ultrasonic transceiver causing it to emit an ultrasonic pulse. On time-out of the pulse duration as dictated by the monostable multivibrator 27, gate 28 is closed and amplifier 29 activated. The pulses which are then received are amplified by amplifier 29, rectified by the rectifier stage 30 and sensed in the sensing circuit 31 preferably by integration for analog measurement.

As an alternative to the foregoing circuits other prior art circuits may be used to determine the ultrasonic propagation times of each ultrasonic transceiver 6, 7', 7" and 8. Since such techniques and circuits are nothing new to the expert in the field of ultrasonic measurements, there is no need to detail these alternative circuits.

After establishing the difference or the quotient of the ultrasonic propagation time of the signals sensed by the ultrasonic receivers 6,7' and by the ultrasonic receivers 7", 8 respectively the microprocessor determines the milling depth from said quotient. As an alternative, the milling depth may also be determined from the difference of the signals. The right-hand and left-hand milling depth is each compared to a setpoint value, whereby any milling depth not equivalent to the setpoint value produces a reference signal with which the microcomputer 16 signals the corresponding hydraulic valve to adjust the hydraulic cylinders 4, 5 concerned accordingly. The electrohydraulic height control of the bearing fixture 2 is nothing new and thus requires no further explanation.

As an alternative to the example of the foregoing embodiment the height control may also feature a single ultrasonic sensor for gauging the height of the unmachined road surfacing and a further, single ultrasonic transceiver for gauging the height of the machined, stripped road surfacing.

It is clearly understood that the height control device as the object of the present invention may be used just as well in other machines for machining the level height of a plane of an object. Height difference control devices are feasible, for instance, in machines for applying coatings with a specific coating thickness, as well as in grinding and planing machines for removing surfaces to a specific thickness. The range of application of the present invention is dictated solely by the difference between the distances sensed by the ultrasonic sensing device adjacent to the working area and in the working area itself being small as compared to the distances themselves.

We claim:

1. A height control device for a fixture for machining an object essentially defined by a single plane by means of a machining tool for changing the level height of the plane, in particularly for a milling fixture for stripping road surfacing comprising:
    a first gauging device featuring a first ultrasonic transceiver for gauging the distance from the ultrasonic transceiver to the unmachined plane of the object,
    a second gauging device featuring a second ultrasonic transceiver for gauging the distance from the second ultrasonic transceiver to the machined plane,
    a signal generator connected to both gauging devices for generating a first signal representing the change in the level height due to machining from the quotient or difference of the distances measured by said first and second gauging devices, and
    a control device for elevating or lowering the machining fixture so that the signal representing the change in the level height due to machining essentially corresponds to a setpoint value for changing the level height due to machining.

2. A height control device as claimed in claim 1, wherein a third gauging device featuring a third ultrasonic transceiver for gauging the distance from the third ultransonic transceiver to the unmachined plane of the object is provided, and in which said first and third gauging devices are spaced from each other in a direction perpendicular to the machining direction of the machining device.

3. A height control device as claimed in claim 2, wherein said signal generator is also connected to said third gauging device to generate a second signal representing the change in the level height from the quotient or difference of the distances measured by said second and third gauging devices.

4. A height control device as claimed in claim 3, wherein said control device compares both the first and second signal representing the change in the level height due to machining to a setpoint value for the change in the level height and generates a first and a second reference signal.

5. A height control device as claimed in claim 4, wherein said control device signals separate, electrically operated first and second hydraulic valves by means of said first and second reference signals and in which hydraulic actuators are height-adjusted by means of said hydraulic valves.

6. A method for providing a height control device for a fixture for machining an object essentially defired by a single plane by means of a machining tool for changing the level height of the plane, in particularly for a milling fixture for stripping road surfacing comprising the steps of:
    providing a first gauging device featuring a first ultrasonic transceiver for gauging the distance from the ultrasonic transceiver to the unmachined plane of the object;
    providing a second gauging device featuring a second ultrasonic transceiver for gauging the distance from the second ultrasonic transceiver to the machined plane;
    providing a signal generator connected to both gauging devices for generating a first signal representing the change in the level height due to machining from the quotient or difference of the distances measured by said first and second gauging devices; and
    providing a control device for elevating or lowering the machining fixture so that the signal representing the change in the level height due to machining essentially corresponds to a setpoint value for changing the level height due to machining.

7. The method as claimed in claim 6 including providing a third gauging device featuring a third ultrasonic transceiver for gauging the distance from the third ultrasonic transceiver to the unmachined plane of the object, said first and third gauging devices are spaced from each other in a direction perpendicular to the machining direction of the machining device.

8. The method as claimed in claim 7 wherein said signal generator is also connected to said third gauging device to generate a second signal representing the change in the level height from the quotient or difference of the distances measured by said second and third gauging devices.

9. The method as claimed in claim 8 including the step of using said control device to compare both the first and second signal representing the change in the level height due to machining to a setpoint value for the change in the level height and to generate a first and second reference signal.

10. The method as claimed in claim 9 wherein said control device signals separate, electrically operated first and second hydraulic valves by means of said first and second reference signals and in which hydraulic actuators are height-adjusted by means of said hydraulic valves.

* * * * *